US007567169B2

(12) United States Patent
Dickmann et al.

(10) Patent No.: US 7,567,169 B2
(45) Date of Patent: Jul. 28, 2009

(54) DEVICE PERTAINING TO A MOTOR VEHICLE, USED TO PROVIDE DATA RELATING TO AN ACCIDENT

(75) Inventors: Jürgen Dickmann, Ulm (DE); Rainer Justen, Altdorf (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/569,072

(22) PCT Filed: Aug. 5, 2004

(86) PCT No.: PCT/EP2004/008776

§ 371 (c)(1),
(2), (4) Date: Jan. 3, 2007

(87) PCT Pub. No.: WO2005/022484

PCT Pub. Date: Mar. 10, 2005

(65) Prior Publication Data

US 2007/0132564 A1 Jun. 14, 2007

(30) Foreign Application Priority Data

Aug. 23, 2003 (DE) ................................ 103 38 759

(51) Int. Cl.
*B60Q 1/00* (2006.01)

(52) U.S. Cl. ................... 340/436; 340/539.17; 701/300

(58) Field of Classification Search .................. 340/905
See application file for complete search history.

(56) References Cited

U.S. PATENT DOCUMENTS 4,369,426 A 1/1983 Merkel
5,353,023 A 10/1994 Mitsugi
5,630,209 A * 5/1997 Wizgall et al. .............. 455/521
5,914,675 A * 6/1999 Tognazzini ................. 340/989
6,073,004 A 6/2000 Balachandran
6,282,491 B1 * 8/2001 Bochmann et al. ........ 455/556.2
6,340,928 B1 * 1/2002 McCurdy .................... 340/436
6,377,165 B1 * 4/2002 Yoshioka et al. ......... 340/425.5
6,574,463 B1 6/2003 Yoshioka (Continued)

FOREIGN PATENT DOCUMENTS

DE 29 12 547 10/1980

(Continued)

OTHER PUBLICATIONS

Written Opinion of the International Search Authority, PCT International Patent Application No. PCT/EP2004/008776 (translation of Supplementary Pages provided).

(Continued)

*Primary Examiner*—Eric M Blount
(74) *Attorney, Agent, or Firm*—Kenyon & Kenyon LLP

(57) ABSTRACT

In a device for a motor vehicle for providing data relating to an accident, the data relating to an accident includes both position data of the motor vehicle and data relating to the vehicle, which in turn includes recovery-related specification data. Furthermore, a conversion device is for converting an emergency call which is received by such a device, the recovery-related specification data being converted automatically into a reproduction form which is understandable for persons involved in the recovery, and output.

14 Claims, 1 Drawing Sheet

U.S. PATENT DOCUMENTS

| | | | | |
|---|---|---|---|---|
| 6,618,657 | B1 * | 9/2003 | Geil et al. | 340/436 |
| 6,724,321 | B2 * | 4/2004 | Kuragaki et al. | 340/928 |
| 6,985,717 | B1 | 1/2006 | Yoshioka | |
| 7,158,016 | B2 * | 1/2007 | Cuddihy et al. | 340/436 |
| 7,289,786 | B2 * | 10/2007 | Krasner | 455/404.2 |
| 2001/0025590 | A1 | 10/2001 | Seifman et al. | |
| 2002/0037707 | A1 * | 3/2002 | Yoshioka et al. | 455/404 |
| 2002/0084918 | A1 * | 7/2002 | Roach | 340/988 |
| 2003/0112133 | A1 * | 6/2003 | Webb et al. | 340/436 |

FOREIGN PATENT DOCUMENTS

| | | |
|---|---|---|
| DE | 33 36 092 | 4/1985 |
| DE | 38 39 959 | 4/1990 |
| DE | 42 20 963 | 1/1993 |
| DE | 44 21 508 | 12/1994 |
| DE | 43 21 416 | 1/1995 |
| DE | 44 21 960 | 1/1996 |
| DE | 196 50 176 | 6/1997 |
| DE | 196 44 445 | 4/1998 |
| DE | 198 36 118 | 4/1999 |
| DE | 100 15 895 | 11/2000 |
| EP | 1 143 400 | 10/2001 |
| GB | 2 045 988 | 11/1980 |
| WO | WO 95/00860 | 1/1995 |

OTHER PUBLICATIONS

International Preliminary Examination Report, PCT International Patent Application No. PCT/EP2004/008776 (translation of Supplementary Pages provided).

* cited by examiner

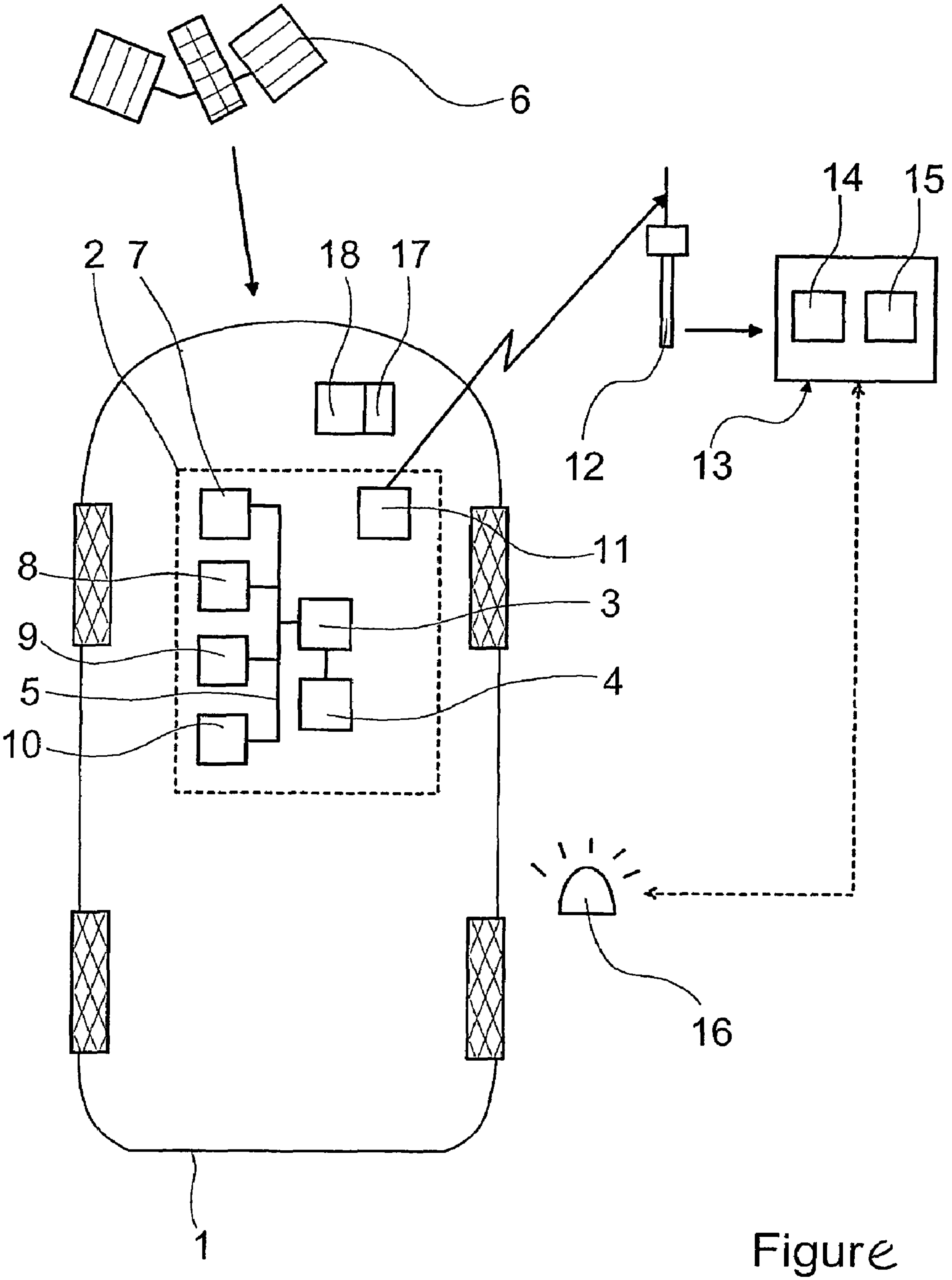
Figure

DEVICE PERTAINING TO A MOTOR VEHICLE, USED TO PROVIDE DATA RELATING TO AN ACCIDENT

FIELD OF THE INVENTION

The present invention relates to a device pertaining to a motor vehicle for providing data relating to an accident, the data relating to an accident including, e.g., both position data of the motor vehicle and data relating to the vehicle.

BACKGROUND INFORMATION

Certain automatic emergency call systems which significantly shorten the recovery times after an accident are conventional. Examples of these systems are described German Published Patent Application No. 29 12 547, German Published Patent Application No. 33 36 092, German Published Patent Application No. 38 39 959, German Published Patent Application No. 42 20 963, German Published Patent Application No. 43 21 416, German Published Patent Application No. 44 21 508, German Published Patent Application No. 44 21 960, German Published Patent Application No. 196 44 445, German Published Patent Application No. 196 50 176 and German Published Patent Application No. 198 36 118.

Depending on the configuration of the emergency call system, in the event of an accident an emergency call is transmitted to an emergency call center automatically or when an emergency call button on a mobile radio system mounted on board the vehicle or a mobile phone carried on the person is activated. Such an emergency call may be configured, for example, in accordance with German Published Patent Application No. 38 39 959, in the form of an emergency call telegram which, in addition to the position of the vehicle involved in the accident, also includes data relating to the vehicle such as the keeper of the vehicle, the registration number, the type of the vehicle, the color of the vehicle and the hazard class in the case of bulk goods transporters and/or data relating to an accident situation, such as the severity of an accident, the acceleration profile before the crash, triggered vehicle occupant protection devices, etc.

The position of the motor vehicle involved in the accident is usually calculated by a satellite-supported location determining system but a locating process of a mobile radio device which is located on board may also be used for this purpose.

The data relating to the vehicle and the data relating to vehicle occupants can be stored in the motor vehicle in a memory which is fixed to the vehicle or else on a chip card carried on the person, it being also possible to provide in the case of individual emergency call systems that the data stored in the memory is updated before the journey is started, for example, by manual input.

Conventional emergency call systems permit perceptible gain in time in the rescue phase after the vehicle has been involved in an accident by virtue of shortened search times and a shortened driving time to the location of the accident, and the medical treatment can be improved due to quickly available information about the current injury situation of the casualties of the accident and, if appropriate, individual medical information on specific persons.

However, the recovery of casualties still appears problematic in many cases. In order to save lives in the case of relatively serious accidents, the recovery forces must be able to access the injured as quickly as possible without exposing themselves or the injured to additional danger. However, a precondition for this is knowledge about vehicle-specific access possibilities and the method of functioning and the method of operation of the safety systems of the motor vehicle involved in the accident.

U.S. Pat. No. 6,377,165 describes an emergency call system in which rescue personnel can read out stored data relating to the configuring state of an airbag, to the temperature, to the analysis of a collision and other data relating to the vehicle by pressing a data switch, in response to which the data is displayed by a display device. The display device is integrated into the vehicle or the display unit of a navigation system is used. There is, however, no mention of the problem that in many cases it may be very difficult for the rescue personnel to request the outputting of data if, for example, the interior of the vehicle is not readily accessible due to jammed vehicle doors.

It is conventional to make available such information in book form, but such publications may have the disadvantage that current new developments are only included in the corresponding publications after a delay. Furthermore, access to the correct information for the rescue forces may be difficult since reference works which document the entire range of models of a manufacturer are correspondingly comprehensive and the relevant parts of text which relate to the vehicle involved in an accident may be awkward to find.

SUMMARY

An example embodiment of the present invention may provide a device for a motor vehicle for providing data relating to an accident, by which device the rescue times after an accident may be shortened further, and the flow of information, e.g., regarding the recovery situation, may be optimized.

According to an example embodiment of the present invention, in a device for a motor vehicle for providing data relating to an accident, the data relating to an accident may include both position data of the motor vehicle and data relating to the vehicle and the data relating to the vehicle comprising recovery-related specification data.

Furthermore, in a recovery device for converting an emergency call received by such a device, the recovery-related specification data may be automatically converted into a reproduction form which is comprehensible for people participating in the recovery, and output.

The device may provide that, in addition to the data already provided by emergency call systems mentioned above, such as, for example, the geographic position of the vehicle, information for the recovery of the motor vehicle involved in the accident or its vehicle occupants, etc., which may significantly improve the rescue process is made available. By selective recovery-related data it may already be possible to optimize recovery resources when the data is transmitted to a recovery control center, for example, by taking along relatively heavy or unusual recovery equipment which may be necessary for armored vehicles with special reinforcements or for vehicles with special equipment suitable for the disabled.

Furthermore, it may be provided that the recovery-related specification data includes details about an installation location and/or a type and/or a status, etc., of safety devices which are installed in the motor vehicle and may be activated automatically when the motor vehicle is involved in an accident. Such specification data may include details about the number, the position and the type or multi-stage design of existing airbags and their triggering stage and the positioning of gas cartridges, e.g., in pillars and the doors of the motor vehicle. Providing such information may make it possible to prevent a situation in which, for example, when the roof of the vehicle involved in the accident is cut off, subsequently triggering of an airbag leads to further injuries to the vehicle occupants of the vehicle involved in the accident or to the recovery personnel.

By transmitting structural details relating to the reinforcement of the bodywork of the vehicle, it may be possible, by interaction with further data which describes the accident situation in more detail, already to prepare the use of recovery device(s) to an optimum degree on the way to the recovery location and to open up the vehicle as quickly as possible in situ.

Such recovery-related specification data for initially arriving rescuers may include the position and the type of batteries installed in the vehicle as well as the presence and the position of an emergency off switch for the power supply in the motor vehicle, etc.

If hazardous goods are located on board the vehicle involved in the accident or if it is determined that materials which constitute a health risk are escaping from the vehicle involved in the accident, the recovery chain may be appropriately configured by the early transmission of such information to the emergency call control center.

The recovery-related specification data which may include recovery measures, predefined for specific accident situations, in the form of a manual, may be stored in a vehicle-mounted memory from which the aforesaid data may be called or retrieved. The storage of the recovery-related specification data in a fixed memory may provide that approximately simultaneous updating of the data stored therein which relates to the specific vehicle may be possible.

In order to provide that the recovery-related specification data is read out of the vehicle-mounted memory by the recovery forces even after the general power supply has been disconnected, it is possible to provide a separate emergency power supply for this purpose.

If the device includes a transmitter device by which an emergency call, for example, in the form of what is referred to as an emergency call telegram, which includes the recovery-related specification data, may be sent to an emergency call control center, the recovery measures may be initiated by the recovery control center immediately after the accident occurs, either after an automatic report or after the accident is reported by activating an emergency call button, with the result that there may be considerable gain in time during the recovery itself and improved medical supplies to casualties of the accident may be possible.

However, the recovery-related data may also be output in situ at the vehicle involved in the accident by a vehicle-mounted information output device, which may provide that the recovery instructions are available even if the remote transmission of the data to the emergency call control center or to the rescue personnel has failed.

The information output device which may be provided at easily accessible locations on the motor vehicle involved in the accident may include both alphanumeric text units and graphic units with the recovery-related specification data.

A simple manner of configuring the vehicle-mounted information output device is to provide an information sticker including text and/or graphics at an easily accessible location on the vehicle involved in the accident, for example, on the lid of the trunk or the hood or at some other salient location such as, for example, the battery cover since generally the battery may be looked for first in order to disconnect the power supply.

If appropriate, the text unit of the information output device may also include a code which is specific to the vehicle and which is assigned vehicle-specific, recovery-related specification data which is stored in an electronic medium such as, for example, the Internet or a print medium, etc. Such information which is assigned to a code may be made available, for example, in corresponding, downloadable files on the Internet or may be sent as an email or SMS to mobile telecommunication devices of the rescuers.

Approximately simultaneous updating of the recovery-related specification data for the respectively latest types of vehicle and model series may also be possible in this manner. A code version may also be updated independently of the model series and may be necessary only when there are new technologies.

In order to be able to provide that the rescue forces concentrate on the recovery work, it may be provided the vehicle-mounted information output device includes a voice output device. Voice output may be carried out by loudspeakers of a radio device, of a telecommunication device or of what is referred to as a command system, etc. The radio device, the telecommunication device or the respective command system may have a permanently programmed voice chip for this purpose.

Recovery instructions may also be output by a monitor of a navigation system, using graphic or alphanumeric characters, etc.

The data which relates to an accident and which is made available by the device hereof may also include information for accident classification. This includes details about the collision speed, a more precise indication of the location, which includes the vehicle route, the direction of travel and, if appropriate, an exit number of a high-speed road, etc. An accident classification may be made from an emergency call control center by data relating to the type of accident, for example, frontal impact, side impact or rear end impact, roll-over, initiation of what is referred to as a pre-safe phase, skidding of a vehicle, etc., the precise direction of the crash and the crashing nature of the crash object. Further important information supplies data about the position of the vehicle, the number and the sitting position of the vehicle occupants, the restraint device(s) used, for example, a child's seat or seatbelts and their status. The manner in which this data is determined may be conventional such as is described, for example, in the patent documents mentioned above.

If the vehicle occupants have stored person-related data before the start of a journey, the rescue situation may be improved further for the occupants of the vehicle involved in the accident. For example, information for identifying the vehicle occupants and details about their sex, age, weight and particular medical information in combination with information about the current state of the vehicle occupants may provide indications which are important for suitable recovery methods, for example, with respect to the possibility of talking to them.

The use of a personal mobile phone may also support the personalization of data about persons using a telephone or transmitter which is fixed to the vehicle. Linking the device hereof to a personal mobile phone may also provide that an emergency call button on the mobile phone may make available the emergency call function even without a satellite-supported, geographic positioning system or navigation system.

In order to make the recovery-related specification data which is transmitted with an emergency call understandable to rescue persons involved, example embodiments of the present invention may also provide a conversion device for converting an emergency call received by a device of a motor vehicle for providing recovery-related specification data, the recovery-related specification data being converted automatically into a reproduction form which is understandable for rescuers involved in the recovery, and output.

Further features and aspects of example embodiments of the present invention are described below with reference to the appended Figure.

BRIEF DESCRIPTION OF THE DRAWING

The FIGURE schematically illustrates a vehicle involved in an accident having a device according to an example embodiment of the present invention.

DETAILED DESCRIPTION

The FIGURE illustrates in a schematic form a motor vehicle 1 which is involved in an accident, with a device 2 which is being carried in the vehicle and has the purpose of providing data relating to an accident. This device 2 has a control device 3 in the form of a microcomputer which is connected to a memory 4 and to a plurality of signal transmitters via a CAN bus 5.

A locating and navigation system 7 which is connected to a satellite 6, safety devices 8 which may be activated automatically in the event of an accident, and a temperature and/or gas sensor system 9 are illustrated in the FIGURE as a signal transmitter.

The safety devices 8 which may be activated may include restraint devices, such as an airbag and a seatbelt with seatbelt pretension and movable impact bodies, cushions and headrests whose size, hardness, shape and position may be changed by a drive device, etc. Furthermore, devices which place the vehicle occupant in a position which is favorable in terms of an accident, such as an electric seat adjustment device, a headrest adjustment device, a seatbelt pretensioner and movable upholstered items, etc., may be actuated.

Protection device(s) which serve to protect parties to a collision such as pedestrians and cyclists, the device including, for example, an adjustable hood, movable bumpers and impact elements with adjustable hardness on the outer skin of the vehicle, etc., may also be activated. It is also possible to make corresponding interventions into the ride level control system and into the break system and steering system.

Furthermore, the control device 3 is linked to a passenger sensor system 10 which determines the number of passengers and their weight and may include a vital sensor system for observing vehicle occupants and non-invasive measurement of vital parameters of the vehicle occupants.

The output of the control device 3 is connected to a transmission device 11 which is connected to a transmission and reception antenna and by which an emergency call may be sent to a receiver station 12 of an emergency call control center 13.

Instead of the transmission device 11, it is also possible to provide a connection point for a mobile phone which is carried on the vehicle occupant's person.

The emergency call control center 13 has an output device 14 for displaying graphic and alphanumeric characters and outputting voice data. Furthermore, the emergency call control center 13 has a conversion device 15 by which information which is transmitted to the emergency call control center 13 by the data provision device 2 of the motor vehicle 1 is automatically converted into a reproduction form which rescue personnel 16 involved in the recovery and to whom this information is sent by the emergency call control center 13 may understand.

Recovery-related specification data which is output by the transmitter device 11 of the motor vehicle 1 in the form of an emergency call telegram is converted at the emergency call control center 13 into a data sequence containing recovery instructions which may be received, for example, via a multimedia mobile phone device and be output to it in graphic and audible form.

In order to be able to initiate in an optimum manner the immediate measures which may be necessary for recovery, the emergency call telegram may include numerous data relating to an accident, in which case in addition to position data of the motor vehicle 1, it is also possible to output vehicle-related data which includes recovery-related specification data. Thus, details about the installation, the type and the status of the safety devices 8 which are installed in the motor vehicle 1 and are activated automatically when the motor vehicle 1 is involved in an accident are output, in which case, for example, the indication of which airbags have been triggered, which stage they have been triggered with and which of them are still "primed" may reduce the risk for the rescue personnel 16 when working on the vehicle, such as, for example, when cutting open parts of the bodywork.

By transmitting a first accident classification, which also includes the direction of force of the crash, the emergency call control center 13 may also deploy the recovery forces 16 efficiently, and emergency doctors may prepare and initiate treatment options which are optimized in accordance with the situation. The data provision device 2 illustrated may be capable of transmitting personalized vehicle occupant data, which has been stored in advance, such as, e.g., the body size, body proportions, body weight, information about the pregnancy, implants or other medical states to be considered, etc.

In addition, a bidirectional voice link may be provided with the emergency call and may permit voice contact between the vehicle occupants and the emergency call control center 13 and also may allow the ability of the vehicle occupants to speak to be tested.

Recovery-related specification data which does not necessarily have to be transmitted in advance to the emergency call control center 13 by remote transmission, and which only has to be capable of being called in situ, may be provided by a vehicle-mounted information output device 17 which may be provided as a readable chip on a vehicle battery 18 and may make available information for disconnecting the power supply in the form of a text file and/or graphic file and/or speech file, etc.

It is also possible to provide a plurality of such information output devices or other types of information output devices which output recovery-related specification data, e.g., about the respective area of the motor vehicle in which they are arranged.

The invention claimed is:

1. A system, comprising:

a motor vehicle mounted information output device adapted to provide data relating to an accident, the data including recovery-related specification data, the device arranged at a recovery-related location on the motor vehicle that is easily accessible to rescue personnel;

wherein the recovery-related specification data includes data relating to:

(a) at least one of (i) an installation location, (ii) a type and (iii) a status of at least one safety device installed in the motor vehicle and automatically activatable when the motor vehicle is involved in an accident;

(b) at least one of (i) an installation location and (b) a type of at least one battery that is installed in the motor vehicle;

(c) a position of an emergency off switch for a power supply in the motor vehicle; and (d) reinforcements for parts of a vehicle bodywork.

2. The system according to claim 1, wherein the device is arranged on one of (a) a lid of a trunk, (b) a hood, and (c) a battery cover.

3. The system according to claim 1, wherein the device includes a chip mounted on a vehicle battery and is adapted to make available retrievable information.

4. The system according to claim 1, wherein the device includes a memory device affixed to the vehicle, the recovery-related specification data retrievable from the memory device.

5. The system according to claim 1, wherein the device includes a voice output device adapted to output the recovery-related specification data.

6. The system according to claim 1, wherein the device includes a plurality of voice output devices, each voice output device adapted to output the recovery-related specification data about a respective area of the motor vehicle at which the voice output device is arranged.

7. The system according to claim 1, wherein the device includes at least one of (a) a text unit and (b) a graphic unit that includes the recovery-related specification data.

8. The system according to claim 7, wherein the text unit includes a vehicle-specific code that is assigned vehicle-specific, recovery related specification data stored in one of (a) an electronic medium and (b) a print medium.

9. The system according to claim 1, further comprising a transmission device adapted to send an emergency call that includes the recovery-related specification data to an emergency-call control center.

10. A method, comprising:

automatically converting an emergency call that includes recovery-related specification data relating to a motor vehicle accident into a reproducible form that is comprehensible to persons participating in a recovery; and outputting the converted recovery-related specification data on a motor vehicle mounted information output device adapted to provide the data relating to the motor vehicle accident, the device arranged at a recovery-related location on the motor vehicle that is easily accessible to rescue personnel;

wherein the recovery-related specification data includes data relating to:

(a) at least one of (i) an installation location, (ii) a type and (iii) a status of at least one safety device installed in the motor vehicle and automatically activatable when the motor vehicle is involved in an accident;

(b) at least one of (i) an installation location and (b) a type of at least one battery that is installed in the motor vehicle;

(c) a position of an emergency off switch for a power supply in the motor vehicle; and (d) reinforcements for parts of a vehicle bodywork.

11. The method according to claim 10, wherein the converting and outputting steps are performed by a transmission device of a motor vehicle mounted information output device that is adapted to provide data relating to the accident, the data including the recovery-related specification data, the device arranged at a recovery-related location on the motor vehicle that is easily accessible to rescue personnel, the transmission device sending the emergency call that includes the recovery-related specification data to an emergency-call control center.

12. The method according to claim 10, wherein the automatic conversion is performed in an emergency call control center, the outputting step including transmitting the converted recovery-related specification data by the emergency call control center to the persons participating in the recovery.

13. The system according to claim 1, wherein the recovery-related specification data includes data relating to at least one of (i) special equipment items, (ii) special protection devices, and (iii) special devices suitable for disabled vehicle occupants.

14. The method according to claim 10, wherein the recovery-related specification data includes data relating to at least one of (i) special equipment items, (ii) special protection devices, and (iii) special devices suitable for disabled vehicle occupants.

* * * * *